Patented Aug. 7, 1945

2,380,958

UNITED STATES PATENT OFFICE 2,380,958

PROCESS FOR HYDROCARBON CONVERSION

Hillis O. Folkins, Skokie, and Carlisle M. Thacker, Highland Park, Ill., assignors to The Pure Oil Company, Chicago, Ill., a corporation of Ohio No Drawing. Application July 12, 1943,
Serial No. 494,354

18 Claims. (Cl. 196—52)

This invention relates to conversion of hydrocarbons and particularly to higher-boiling hydrocarbons into lower-boiling hydrocarbons or the conversion of hydrocarbons into hydrocarbons containing less hydrogen in the molecule.

One of the objects of this invention is to provide an improved method for converting hydrocarbons into lower boiling hydrocarbons.

Another object of the invention is to provide a method for accelerating the rate of cracking or to make possible cracking of hydrocarbons at lower temperatures in conventional types of cracking processes.

Other objects of the invention will appear from the following description.

In accordance with our invention, hydrocarbons to be converted are subjected to conversion conditions of time, temperature and pressure in admixture with a small amount of a halogenated organic compound containing an unsaturated open chain radical and more particularly those compounds which contain halogen in the unsaturated open chain radical. Compounds which are particularly effective as sensitizers to accelerate the cracking of hydrocarbons, are halogenated aliphatic hydrocarbons containing unsaturated carbon to carbon linkages such as allyl bromide, allyl iodide, chloroprene, methallyl bromide and methallyl chloride. Halogenated alkenes, alkadienes, and alkynes may be used. Those compounds containing bromine and iodine in an unsaturated open chain radical or group appear to be the most active.

Although various halogen compounds have heretofore been disclosed as sensitizers for cracking reactions, we believe that we are the first to discover that when the halogen is attached to a compound containing an unsaturated open chain radical, the activity of the compound is greatly enhanced.

In carrying out our invention, the hydrocarbons undergoing reaction should contain in admixture therewith from 0.1 to 5 mole per cent of a halogenated organic compound containing an unsaturated open chain radical or group, although we prefer to use from .25 to 3 mole per cent. Higher or lower amounts may be used, but within the range above specified, the increase in reaction rate is very marked and formation of undesirable amounts of halogen-containing products is avoided.

Our invention may be carried out in cracking apparatus either of the straight thermal type or the catalyst type. Sensitizers falling within the scope of our invention will accelerate purely thermal as well as catalytic cracking processes wherein a solid catalyst is used, suspended in the vapor undergoing cracking or as a stationary or moving bed. The sensitizer may be mixed with a hydrocarbon oil, vapor or gas undergoing conversion prior to charging it to the reaction zone, or the sensitizer may be separately injected directly into the reaction zone. Although we prefer to use compounds as sensitizers which are in the same physical state as the hydrocarbons at reaction temperature, compounds may be used which exist in a different physical state from that of the hydrocarbons at reaction temperature. The sensitizer, if soluble in the hydrocarbons undergoing conversion, may be dissolved therein prior to passage through the reaction zone, or may be dissolved in a small portion of the hydrocarbons undergoing reaction and fed into the main stream of hydrocarbons in the desired proportions. If the sensitizer is a solid which is insoluble in the hydrocarbon undergoing reaction, a slurry of finely comminuted sensitizer in a portion of the hydrocarbon oil may be prepared and fed in the desired proportion into the main stream of oil. Where cracking of gases or of oil in vapor phase is practiced, sensitizers which readily vaporize and can be mixed with the vapor undergoing conversion are preferably used. We prefer to introduce the sensitizer into the mixture undergoing reaction in such a manner that the decomposition of the sensitizer does not occur until it is in contact with hydrocarbons to be decomposed, at reaction temperature. One method of doing this, is to flash inject the sensitizer at a temperature below its decomposition temperature into the reaction chamber.

Cracking with sensitizers in accordance with our invention may be carried out under sub-atmospheric, atmospheric or super-atmospheric pressure and at temperatures from the lowest temperatures at which cracking will occur to temperatures of approximately 2000° F. depending upon the nature of the charging stock and the type of product it is desired to produce. Where cracking of hydrocarbon oil is conducted for the purpose of making lighter oils, such as gasoline, temperatures ranging from approximately 650° to 1200° F. may be used. Where cracking of hydrocarbon oils or gases for the purpose of making aromatic hydrocarbons is practiced, temperatures of approximately 1000 to 1500° F. may be used. Where it is desired to produce butadiene from hydrocarbon oils, temperatures from the vicinity of 1300 to 1600° F. may be used, and where it is desired to crack hydrocarbon oils to gases, hydrocarbon temperatures of from approximately 1500° to 2000° F. may be used.

In order to demonstrate the efficacy of sensitizers falling within the scope of the invention, a series of runs were made using propane, butane and pentane as charging stock. The runs were all made in laboratory apparatus constructed of Pyrex glass, at temperatures of either 500 or 525° C. Before each run, the reaction vessel was evacuated to approximately 0.001 mm. or less of mercury, while maintaining the temperature at the desired reaction level. The hydrocarbon was then charged to the reaction chamber admixed with the desired quantity of sensitizer until, in the case of propane and butane, the pressure was approximately atmospheric and in the case of pentane, the pressure was approximately 400 mm. of mercury. Pressure increases in the reaction chamber were noted at definite intervals ranging from .5 to 2 minutes until a pressure increase of 25% had been attained. When the pressure increased 25%, the reaction chamber was quickly evacuated and the reaction products were analyzed for acidic constituents by absorption in caustic potash solution, for unsaturates by absorption in fuming sulfuric acid, for hydrogen by contraction in volume due to water formation, and for carbon monoxide by oxidation followed by absorption in caustic potash solution.

In addition to the runs made with various sensitizers, a number of blank runs were made in which only the hydrocarbon without sensitizers was charged to the reaction vessel. For purposes of determining the acceleration in reaction caused by the sensitizers, comparison was made with runs performed immediately before or after the particular sensitized run.

The data for the runs made are tabulated in Table I.

TABLE I

| Run No. | Charge | Sensitizer | Mole percent sensitizer | Initial pressure mm. Hg. | Time in minutes required for pressure increase of— | | | Sensitization factors for Δ P% of— | | | Temp., °C. |
|---|---|---|---|---|---|---|---|---|---|---|---|
| | | | | | 5% | 12.5% | 25% | 5% | 12.5% | 25% | |
| 743-F | Propane | | | 784.5 | 12.05 | 38.87 | 104 | | | | 525 |
| 748-F | | | | | | | | | | | |
| 750-F (average) | | | | | | | | | | | |
| 749-F | do | Allyl bromide | 1.0 | 773.5 | 0.44 | 6.74 | 24.82 | 27.4 | 5.8 | 4.2 | 525 |
| 752-F | do | Allyl iodide | 1.0 | 785.0 | 12.06 | 25.60 | 44.87 | 1.0 | 1.5 | 2.3 | 525 |
| 669-F | Butane | | | 787.0 | 2.09 | 7.08 | 19.20 | | | | 525 |
| 673-F | | | | | | | | | | | |
| 677-F (average) | | | | | | | | | | | |
| 666-F | do | Allyl bromide | 1.0 | 781.0 | 0.11 | 0.27 | 0.72 | 19.0 | 26.2 | 26.7 | 525 |
| 667-F | do | do | 0.5 | 764.0 | 0.13 | 0.33 | 1.58 | 16.1 | 21.5 | 12.2 | 525 |
| 668-F | do | do | 0.25 | 750.0 | 0.18 | 0.46 | 2.98 | 11.6 | 15.4 | 6.4 | 525 |
| 670-F | do | Allyl iodide | 1.0 | 759.0 | 0.80 | 2.00 | 3.58 | 2.6 | 3.5 | 5.4 | 525 |
| 671-F | do | do | 0.5 | 759.0 | 1.01 | 2.35 | 4.27 | 2.1 | 3.0 | 4.5 | 525 |
| 672-F | do | do | 0.25 | 794.0 | 1.26 | 2.84 | 5.13 | 1.7 | 2.5 | 3.7 | 525 |
| 785-F | Pentane | | | 403.0 | 7.76 | 21.07 | 48.05 | | | | 500 |
| 786-F | | | | | | | | | | | |
| 790-F | | | | | | | | | | | |
| 791-F (average) | | | | | | | | | | | |
| 788-F | do | Allyl bromide | 1.0 | 392.0 | 0.14 | 0.36 | 1.86 | 55.4 | 58.5 | 25.8 | 500 |
| 793-F | do | Allyl iodide | 1.0 | 411.5 | 1.26 | 3.05 | 5.88 | 6.2 | 6.9 | 8.2 | 500 |

The sensitization factor for pressure changes of 5%, 12.5% and 25% pressure increases are obtained by dividing the time required for the average pressure increase on the blank runs appearing immediately before the sensitized runs by the time required for the same pressure increase for the run using sensitizer. The sensitization factor is, therefore, a direct indication of the rate of acceleration of the reaction caused by the sensitizer.

The results on the runs tabulated in Table I show that the alkene bromides are far superior to the alkene iodides as sensitizers. The sensitization factor of allyl bromide is extraordinary. With butane as charging stock at a temperature of 525° C. using 1 mole per cent of allyl bromide, the speed of reaction to obtain a 25% pressure increase was 26.7 times the speed without any sensitizer. With pentane as charging stock, the speed of reaction for 25% pressure increase was 25.8 times that without any sensitizer and for 12.5% pressure increase, the speed was 58.5 times the speed without sensitizer. Another unexpected result observed from the use of allyl iodide and allyl bromide, is that this type of sensitizer improves as the molecular weight of the hydrocarbons subjected to conversion increases. This accelerating effect on higer-boiling hydrocarbons is particularly valuable in connection with the conversion of high-boiling oils into hydrocarbons of gasoline-boiling range or into hydrocarbon gases such as butylene and butadiene.

The nature of the reaction products obtained in the various runs is tabulated in Table II. In general, the composition of the reaction product does not differ materially at any given temperature for a particular charging stock regardless of whether sensitizer is used or not. The large percent of unsaturates in the reaction products compared with the percent of hydrogen in the run, indicates that the reaction is primarily one of splitting of hydrocarbons at the carbon to carbon linkage rather than dehydrogenation.

TABLE II

*Products analysis*

| Run No. | Mol. per cent acids | Mol. per cent unsaturates | Mol. per cent CO | Mol. per cent $H_2$ | Residue |
|---|---|---|---|---|---|
| 743-F | 0.0 | 18.9 | 0.2 | 4.9 | 76.0 |
| 748-F | 0.0 | 18.5 | 0.4 | 5.8 | 75.3 |
| 750-F | 0.0 | 18.6 | 0.2 | 5.6 | 75.6 |
| 749-F | 0.0 | 20.3 | 0.2 | 2.1 | 77.4 |
| 752-F | Sample lost | | | | |
| 666-F | 0.2 | 23.6 | 0.0 | 0.8 | 75.4 |
| 667-F | 0.0 | 19.2 | 0.0 | 0.5 | 80.3 |
| 668-F | 0.3 | 21.5 | 0.0 | 0.8 | 77.4 |
| 669-F | No sample | | | | |
| 673-F | 0.0 | 22.0 | 0.1 | 0.8 | 77.1 |
| 677-F | 0.0 | 22.6 | 0.2 | 0.5 | 76.7 |
| 670-F | 0.2 | 22.7 | 0.1 | 0.6 | 76.4 |
| 671-F | 0.1 | 23.5 | 0.2 | 0.5 | 75.7 |
| 672-F | 0.0 | 23.0 | 0.1 | 0.5 | 76.4 |
| 785-F | 0.1 | 26.0 | 1.9 | 1.9 | 70.1 |
| 786-F | 0.2 | 24.4 | 1.2 | 2.3 | 71.9 |
| 790-F | 0.6 | 23.8 | 0.7 | 3.9 | 71.0 |
| 791-F | 0.2 | 24.4 | 0.3 | 1.1 | 74.0 |
| 788-F | 1.5 | 26.1 | 0.7 | 2.1 | 69.6 |
| 793-F | 0.0 | 25.7 | 0.3 | 3.2 | 70.8 |

Our invention is useful in connection with present types of thermal and cracking operations without the necessity of changing either the operation of such processes or the apparatus required, except to make provision for charging a small amount of sensitizer to the cracking operation. The invention is particularly useful because it causes marked acceleration of the cracking reaction in the absence of other catalysts, such as Friedel-Crafts type and natural and synthetic silica-alumina catalysts. However, it is to be understood that the invention does not exclude the use of either homogeneous or heterogeneous catalysts in conjunction with sensitizers falling within the scope of our invention.

It is claimed:

1. The method of converting hydrocarbons into lower boiling hydrocarbons which comprises subjecting said hydrocarbons to cracking conditions of time, temperature and pressure in the presence of a small amount of a halogenated organic compound containing an unsaturated open chain group selected from the group consisting of bromine and iodine compounds.

2. Method in accordance with claim 1 in which the organic compound is present in amounts of approximately 0.1 to 5 mole per cent of the hydrocarbons.

3. Method in accordance with claim 1 in which the organic compound is an alkene halide.

4. Method in accordance with claim 1 in which the organic compound is an allyl bromide.

5. Method in accordance with claim 1 in which the organic compound is an allyl iodide.

6. The method of cracking higher-boiling hydrocarbons to lower boiling hydrocarbons within the gasoline boiling range which comprises subjecting said hydrocarbons to cracking temperatures of approximately 600° to 1200° F. in the presence of from about 0.1 to 5 mole per cent, based on the hydrocarbons, of an organic compound containing a halogenated unsaturated open chain hydrocarbon group selected from the group consisting of bromine and iodine compounds.

7. Method in accordance with claim 6 in which the organic compound is a halogen substituted alkene.

8. Method in accordance with claim 6 in which the organic compound is an allyl bromide.

9. Method in accordance with claim 6 in which the organic compound is an allyl iodide.

10. Method in accordance with claim 1 in which the organic compound is in the same physical state as the hydrocarbons at reaction temperature.

11. Method in accordance with claim 1 in which the organic compound is flash injected into the reaction zone at a temperature below the decomposition temperature of said compound.

12. Method in accordance with claim 1 in which the conversion is carried out in the absence of a heterogeneous catalyst.

13. The method of cracking hydrocarbons which comprises subjecting said hydrocarbons to suitable cracking conditions of time, temperature and pressure in the presence of a small amount of a halogenated, unsaturated aliphatic hydrocarbon selected from the group consisting of bromine- and iodine-containing hydrocarbons.

14. The method in accordance with claim 13 in which the halogenated hydrocarbon contains bromine.

15. The method in accordance with claim 13 in which the halogenated hydrocarbon contains iodine.

16. The method of cracking butane comprising subjecting butane to cracking temperature in the presence of a small amount of a compound selected from the group consisting of bromine- and iodine-containing unsaturated aliphatic hydrocarbons.

17. Method in accordance with claim 16 in which the compound is allyl bromide.

18. Method in accordance with claim 16 in which the compound is allyl iodide.

HILLIS O. FOLKINS.
CARLISLE M. THACKER.